(12) United States Patent
Iizuka et al.

(10) Patent No.: US 9,259,908 B2
(45) Date of Patent: Feb. 16, 2016

(54) SHAPING SHEET, RESIN DECORATIVE PLATE AND METHOD FOR MANUFACTURING THE SAME

(71) Applicants: Takashi Iizuka, Saitama (JP); Kenichi Tachihara, Chiba (JP); Seiichi Ishida, Saitama (JP)

(72) Inventors: Takashi Iizuka, Saitama (JP); Kenichi Tachihara, Chiba (JP); Seiichi Ishida, Saitama (JP)

(73) Assignee: DAI NIPPON PRINTING CO., LTD, Tokyo (JP)

( * ) Notice: Subject to any disclaimer, the term of this patent is extended or adjusted under 35 U.S.C. 154(b) by 514 days.

(21) Appl. No.: 13/671,189

(22) Filed: Nov. 7, 2012

(65) Prior Publication Data
US 2013/0062005 A1 Mar. 14, 2013

Related U.S. Application Data

(62) Division of application No. 12/530,805, filed as application No. PCT/JP2008/054627 on Mar. 13, 2008, now abandoned.

(30) Foreign Application Priority Data

Mar. 14, 2007 (JP) ................................. 2007-064861

(51) Int. Cl.
*B32B 38/00* (2006.01)
*B32B 3/30* (2006.01)
(Continued)

(52) U.S. Cl.
CPC ................. *B32B 38/00* (2013.01); *B32B 3/263* (2013.01); *B32B 3/28* (2013.01); *B32B 3/30* (2013.01);
(Continued)

(58) Field of Classification Search
CPC ...... B32B 27/08; B32B 2451/00; B32B 7/12; B32B 2037/243; B32B 37/12; B32B 37/153; B32B 17/10; B32B 33/00; B32B 2260/046; B32B 37/00; B32B 13/12; B32B 17/064; B32B 3/30; B32B 38/06; B32B 38/145; B32B 38/00; B32B 7/045; B32B 7/06; B32B 23/08; B32B 23/20; B32B 27/10; B32B 27/12; B32B 27/16; B32B 27/18; B32B 27/20; B32B 27/22; B32B 27/281; B32B 27/283; B32B 27/302; B32B 27/304; B32B 27/306; B32B 27/308; B32B 27/32; B32B 27/34; B32B 27/36; B32B 27/365; B32B 27/38; B32B 27/40; B32B 27/42; B32B 3/263; B32B 3/28; B32B 2255/10; B32B 2255/12; B32B 2255/26; B32B 2260/028; B32B 2262/0246; B32B 2262/0261; B32B 2262/0276; B32B 2262/10; B32B 2262/101; B32B 2262/106; B32B 2264/02; B32B 2264/10; B32B 2270/00; B32B 2274/00; B32B 2307/306; B32B 2307/4026; B32B 2307/538; B32B 2307/75; B32B 2419/00; B32B 2479/00; B32B 2605/00; B32B 5/022; B32B 5/024; B32B 5/145; B44C 1/1716; B44C 1/24; B44C 5/0469; B29C 45/14811; B29C 51/14; B29C 47/0021; B29C 59/02; B29C 59/04; E04F 13/08; E04F 15/02; Y10T 428/24612

USPC .............. 156/280, 283, 282, 278, 305, 307.1, 156/307.3, 245, 247; 428/172
See application file for complete search history.

(56) References Cited

U.S. PATENT DOCUMENTS 5,656,359 A 8/1997 Hirota et al.
7,931,954 B2 4/2011 Kobayashi et al.
(Continued)

FOREIGN PATENT DOCUMENTS

EP 0 680 824 A1 11/1995
EP 1 669 193 A1 6/2006
(Continued)

OTHER PUBLICATIONS

Office Action issued Sep. 28, 2011 in Japan Application No. 2007-064861.
(Continued)

*Primary Examiner* — Jacob T Minskey
*Assistant Examiner* — Vishal I Patel
(74) *Attorney, Agent, or Firm* — Fitch, Even, Tabin & Flannery LLP

(57) ABSTRACT

A method for manufacturing a resin decorative plate capable of shaping a body using a shaping sheet. The shaping sheet is a sheet including a base material having thereon at least a partially or entirely provided ink layer and a surface shaping layer existing on the ink layer, coming into contact therewith and covering over the whole surface including a region where the ink layer is formed and a region where the ink layer is not formed, wherein the surface shaping layer is a layer obtained through crosslinking and curing of a curable resin composition, and in the surface shaping layer, the surface of the surface shaping layer which is located just above the ink layer and in an upper part in the vicinity thereof has a convex shape and additionally has a concave pattern.

21 Claims, 6 Drawing Sheets

(51) Int. Cl.

| | | |
|---|---|---|
| B32B 7/12 | (2006.01) | |
| B32B 38/06 | (2006.01) | |
| B44C 1/24 | (2006.01) | |
| B44C 5/04 | (2006.01) | |
| B32B 37/12 | (2006.01) | |
| B32B 5/02 | (2006.01) | |
| B32B 5/14 | (2006.01) | |
| B32B 7/04 | (2006.01) | |
| B32B 7/06 | (2006.01) | |
| B32B 23/08 | (2006.01) | |
| B32B 23/20 | (2006.01) | |
| B32B 27/08 | (2006.01) | |
| B32B 27/10 | (2006.01) | |
| B32B 27/12 | (2006.01) | |
| B32B 27/16 | (2006.01) | |
| B32B 27/18 | (2006.01) | |
| B32B 27/20 | (2006.01) | |
| B32B 27/22 | (2006.01) | |
| B32B 27/28 | (2006.01) | |
| B32B 27/30 | (2006.01) | |
| B32B 27/32 | (2006.01) | |
| B32B 27/34 | (2006.01) | |
| B32B 27/36 | (2006.01) | |
| B32B 27/38 | (2006.01) | |
| B32B 27/40 | (2006.01) | |
| B32B 27/42 | (2006.01) | |
| B32B 3/26 | (2006.01) | |
| B32B 3/28 | (2006.01) | |
| B29C 59/02 | (2006.01) | |
| B29C 59/04 | (2006.01) | |
| E04F 13/08 | (2006.01) | |
| E04F 15/02 | (2006.01) | |

(52) U.S. Cl.
CPC ................ *B32B 5/022* (2013.01); *B32B 5/024* (2013.01); *B32B 5/145* (2013.01); *B32B 7/045* (2013.01); *B32B 7/06* (2013.01); *B32B 7/12* (2013.01); *B32B 23/08* (2013.01); *B32B 23/20* (2013.01); *B32B 27/08* (2013.01); *B32B 27/10* (2013.01); *B32B 27/12* (2013.01); *B32B 27/16* (2013.01); *B32B 27/18* (2013.01); *B32B 27/20* (2013.01); *B32B 27/22* (2013.01); *B32B 27/281* (2013.01); *B32B 27/283* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B32B 37/12* (2013.01); *B32B 38/06* (2013.01); *B44C 1/24* (2013.01); *B44C 5/0469* (2013.01); *B29C 59/02* (2013.01); *B29C 59/04* (2013.01); *B32B 38/145* (2013.01); *B32B 2255/10* (2013.01); *B32B 2255/12* (2013.01); *B32B 2255/26* (2013.01); *B32B 2260/028* (2013.01); *B32B 2260/046* (2013.01); *B32B 2262/0246* (2013.01); *B32B 2262/0261* (2013.01); *B32B 2262/0276* (2013.01); *B32B 2262/10* (2013.01); *B32B 2262/101* (2013.01); *B32B 2262/106* (2013.01); *B32B 2264/02* (2013.01); *B32B 2264/10* (2013.01); *B32B 2270/00* (2013.01); *B32B 2274/00* (2013.01); *B32B 2307/306* (2013.01); *B32B 2307/4026* (2013.01); *B32B 2307/538* (2013.01); *B32B 2307/75* (2013.01); *B32B 2419/00* (2013.01); *B32B 2451/00* (2013.01); *B32B 2479/00* (2013.01); *B32B 2605/00* (2013.01); *E04F 13/08* (2013.01); *E04F 15/02* (2013.01); *Y10T 428/24612* (2015.01)

(56) References Cited

U.S. PATENT DOCUMENTS

| | | | |
|---|---|---|---|
| 2003/0138617 A1 | 7/2003 | Courtoy et al. | |
| 2007/0231583 A1* | 10/2007 | Ilzuka et al. | 428/423.7 |
| 2009/0011191 A1* | 1/2009 | Saitou et al. | 428/172 |

FOREIGN PATENT DOCUMENTS

| | | | | |
|---|---|---|---|---|
| EP | 1 842 652 A1 | 10/2007 | | |
| JP | 04 122646 | 4/1992 | | |
| JP | 5 92484 | 4/1993 | | |
| JP | 7 164519 | 6/1995 | | |
| JP | 8-72140 | 3/1996 | | |
| JP | 10-72923 | 3/1998 | | |
| JP | 2000-71390 | 3/2000 | | |
| WO | 2005 030486 A1 | 4/2005 | | |
| WO | 2006 080348 | 8/2006 | | |
| WO | WO 2006/080348 A1 * | 8/2006 | | B32B 3/26 |

OTHER PUBLICATIONS

Extended European Search Report issued Jun. 22, 2011, in Patent Application No. 08722031.5.

Japanese Office Action issued May 15, 2012, in patent application No. 2007-064861.

* cited by examiner

SHAPING SHEET, RESIN DECORATIVE PLATE AND METHOD FOR MANUFACTURING THE SAME

CROSS-REFERENCE TO RELATED APPLICATIONS

This application is a Divisional of U.S. patent application Ser. No. 12/530,805 filed Sep. 11, 2009 which is a National Stage of PCT/JP08/054,627 filed Mar. 13, 2008 and claims priority of Japanese Patent Application No. 2007-064861 filed Mar. 14, 2007, the entire contents of which are hereby incorporated by reference.

TECHNICAL FIELD

The present invention relates to a shaping sheet, a resin decorative plate obtained by using the shaping sheet and a method for manufacturing a resin decorative plate using the shaping sheet.

BACKGROUND ART

As building materials which are used as housing instruments and interior materials, for example, furniture, desk tops, various counters, doors, etc., there are in general widely used decorative plates obtained by shaping a synthetic resin based material, for example, thermosetting resin decorative plates, e.g., melamine resin decorative plates, etc.

Hitherto, a thermosetting resin decorative plate having a concave-convex shape on the surface thereof includes one obtained by forming a concave-convex shape by an embossing die or a resin concave-convex sheet and one obtained by forming a concave-convex shape by a shaping sheet. However, when an embossing die having a concave-convex shape formed thereon is used, since it is necessary to subject the die to a surface treatment by blasting, etching, etc., there are generated limitations in minuteness of a concave-convex shape and a pattern. Furthermore, at the time of manufacturing a thermosetting resin decorative plate, an expensive template and a reserve template are necessary, and time and a load of expenses for the preparation of a decorative plate increase, and therefore, the manufacturing cost largely increases, resulting in rendering a product expensive. Also, in case of a resin concave-convex sheet, since a thermosetting resin decorative plate is hardly peeled after the resin has been cured, it is necessary to interpose an aluminum foil, a polypropylene film, etc. in a space with a template, it is very difficult to sharply form a minute concave-convex pattern.

Meanwhile, in recent years, according to the consumer's orientation toward quality goods, an air of luxuriousness is also required for furniture, desks, interior materials, etc., and those having an appearance capable of giving an air of luxuriousness are also desired in decorative plates to be used therefor. For that reason, it is important to impart a texture, and various methods for imparting a delicate concave-convex shape to a decorative plate are proposed.

For example, there is proposed a shaping sheet having a concave-convex shape with an ionizing radiation curable resin provided on the surface of a base material sheet, which is able to faithfully reproduce a desired pattern shape by providing a crosslinking density such that when the shaping sheet is peeled, the concave-convex shape is not broken, and which can be repeatedly used (see Patent Document 1, claim 1). However, in preparing a shaping sheet, a step of peeling it from a roll concave plate is mediated, and therefore, when the concave part is thin, there is a limitation in expressing the concave-convex shape. Also, according to this method, when the concave part is thin, there is involved a problem that unevenness does not clearly appear; whereas when the concave part is thick to some extent, though a concave-convex pattern is obtained on the base material surface, a convex part of a height of the raised part or more is generated, and for example, in case of a woodgrain pattern, there are involved problems that no realist feeling is present and that appearance and touch feeling are poor.

Furthermore, there is proposed a shaping sheet in which a concave-convex layer is formed on the surface of a base material sheet using a resin composition composed of an inorganic filler and a binder resin, and only the resin composition for forming a fine concave-convex layer which is coated on a design pattern formed of a liquid-repellent resin is repelled to form the concave-convex layer (see Patent Document 2, claims). However, there are involved problems that since the concave-convex layer is formed by repelling the resin composition for forming a concave-convex layer, the design by a concave-convex shape is lacking in stability and that since aging of a certain period of time is required for curing the concave-convex layer, it takes a very long time to prepare the shaping sheet so that it is impossible to rapidly respond to diversified needs of consumers.

[Patent Document 1] JP-A-7-164519
[Patent Document 2] JP-A-5-92484

DESCRIPTION OF REFERENCE NUMERALS AND SIGNS

Figure 1:
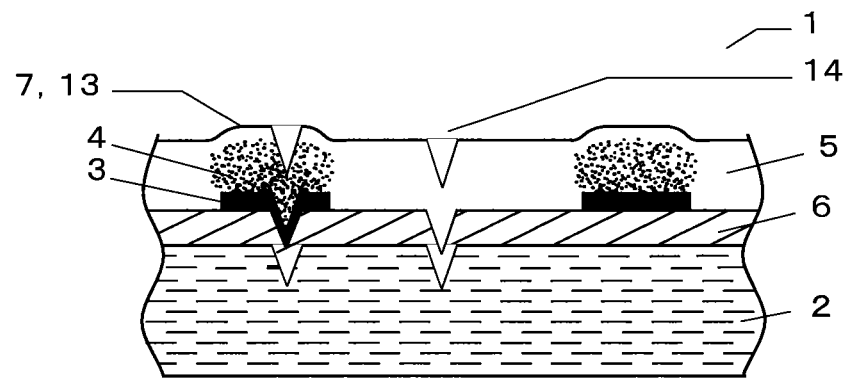
[FIG. 1] is a schematic view showing a section of a shaping sheet of the present invention.

1: Shaping sheet
2: Base material
3: Ink layer
3-a: Ink
3-b: Ink
3-c: Ink
4: Interacting region
4-a: Interacting region
4-b: Interacting region
4-c: Interacting region 5: Surface shaping layer
6: Penetration preventing layer
7: Raised shape
7-a: Raised shape
7-b: Raised shape
7-c: Raised shape
8: Fine particle or baked kaolin particle
8-a: Fine particle or baked kaolin particle
8-b: Fine particle or baked kaolin particle
9: Adhesive layer
10: Substrate
11: Resin decorative plate
12: Fine raised shape
13: Fine concave-convex surface
14: Concave pattern
15: Resin decorative sheet
17: Decorative sheet layer
17-a: Sheet layer
17-b: Solid printing layer
17-c: Design layer
18: Resin layer

DISCLOSURE OF THE INVENTION

Problems that the Invention is to Solve

Under these circumstances, an object of the present invention is to provide a shaping sheet which has a delicate and daring concave-convex shape, is capable of realizing minute shaping with excellent design and touch feeling and having an air of luxuriousness and is excellent in release properties; a resin decorative plate obtained by using the shaping sheet; and a method for manufacturing a resin decorative plate using the shaping sheet.

Means for Solving the Problems

In order to attain the foregoing object, the present inventors made extensive and intensive investigations. As a result, it has been found that a shaping sheet including an ink layer and a surface shaping layer on a base material and further having a concave-convex shape on the surface shaping layer upon application with a concave pattern is able to solve the foregoing problems. The present invention has been accomplished on the basis of such knowledge.

That is, the present invention provides:

(1) A shaping sheet comprising a base material having thereon at least an ink layer provided partially or entirely and a surface shaping layer existing on the ink layer, coming into contact therewith and covering over the whole surface including a region where the ink layer is formed and a region where the ink layer is not formed, wherein the surface shaping layer is a layer obtained through crosslinking and curing of a curable resin composition, and in the surface shaping layer, the surface of the surface shaping layer which is located just above the ink layer and in an upper part in the vicinity thereof has a convex shape and further has a concave pattern;

(2) A resin decorative plate prepared by laminating an adhesive layer and a decorative sheet layer in this order on an upper surface of a substrate, coating a resin composition on the decorative sheet layer, subsequently bringing a shaping sheet into contact therewith and integrally curing and then peeling the shaping sheet to form a resin layer, wherein the shaping sheet is the shaping sheet as set forth above in (1); and (3) A method for manufacturing a resin decorative plate comprising laminating an adhesive layer and a decorative sheet layer in this order on an upper surface of a substrate, coating a resin composition on the decorative sheet layer, subsequently bringing the shaping sheet as set forth above in (1) into contact therewith and integrally curing and then peeling the shaping sheet to form a resin layer.

Advantages of the Invention

According to the present invention, a shaping sheet which has a delicate and daring concave-convex shape, is capable of realizing minute shaping with excellent design and touch feeling and having an air of luxuriousness and is excellent in release properties; a resin decorative plate obtained by using the shaping sheet; and a method for manufacturing a resin decorative plate using the shaping sheet can be obtained. In particular, when used for a delicate pattern such as a woodgrain pattern, a concave-convex feeling of a vessel portion can be realistically expressed, and a shaped decorative material is able to obtain the same texture as in a material using an actual wood.

BEST MODES FOR CARRYING OUT THE INVENTION

The shaping sheet of the present invention comprises a base material having thereon at least an ink layer provided partially or entirely and a surface shaping layer existing on the ink layer, coming into contact therewith and covering over the whole surface including a region where the ink layer is formed and a region where the ink layer is not formed, wherein the surface shaping layer is a layer obtained through crosslinking and curing of a curable resin composition, and in the surface shaping layer, the surface of the surface shaping layer which is located just above the ink layer and in an upper part in the vicinity thereof has a convex shape and further has a concave pattern.

A structure of the shaping sheet of the present invention is described with reference to FIGS. 1 to 7. FIGS. 1 to 7 are each a schematic view showing a section of a shaping sheet 1 of the present invention. An example shown in FIG. 1 is concerned with one in which a penetration preventing layer 6 for covering evenly and uniformly the whole surface, an ink layer 3 and a surface shaping layer 5 obtained through crosslinking and curing of a curable resin composition are laminated in this order on a base material 2, and a fine concave-convex surface 13 is provided on the surface of the surface shaping layer 5. The ink layer 3 is partially present, and an interacting region 4 is formed on the surface shaping layer just above the ink layer 3 and in the vicinity thereof. The interacting region 4 is expressed by collection of dots in the drawing.

Figure 3:
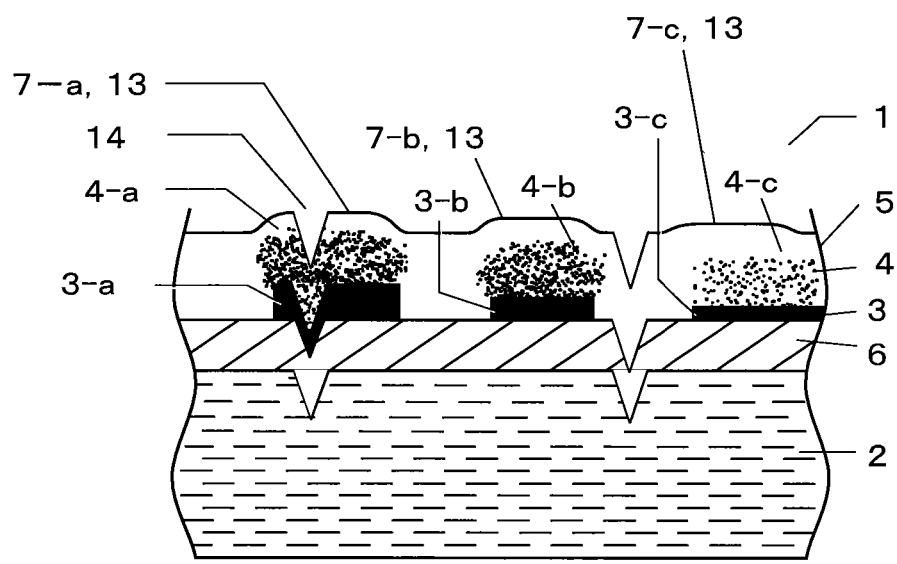
[FIG. 3] is a schematic view showing a section of a shaping sheet of the present invention.

An upper part of the interacting region 4 in the uppermost surface of the surface shaping layer 5 has a raised shape 7 which has raised up with the formation of the ink layer 3. Furthermore, a shaping sheet having a concave-convex shape as a whole and further having a delicate and daring concave-convex shape is formed due to a synergistic effect to be brought by applying a concave pattern 14 by embossing. Furthermore, as shown in FIG. 3, by changing a thickness of the ink layer 3 to reveal the raised shape 7 on the surface of the surface shaping layer 5 depending upon the thickness, a more abundant concave-convex shape can be imparted.

Figure 2:
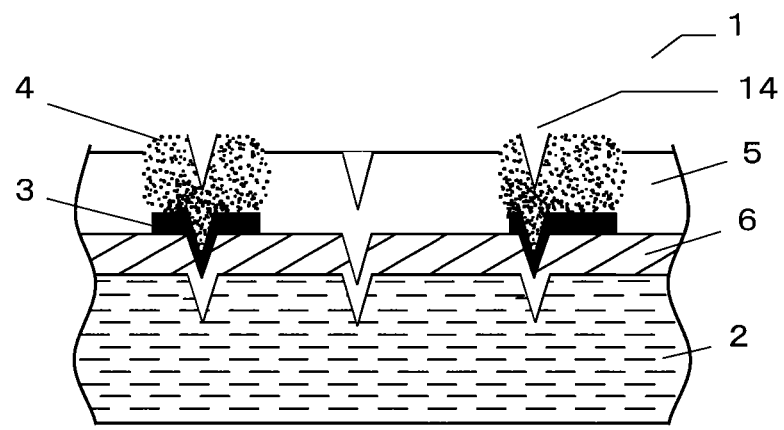
[FIG. 2] is a schematic view showing a section of a shaping sheet of the present invention.

The degree of a spread of the interacting region 4 which is formed in the surface shaping layer 5 is not particularly limited so far as the effects of the present invention are brought, and as shown in FIG. 1 or 2, the interacting region 4 may remain on the way in the thickness direction from the surface of the ink layer 3 to the surface shaping layer 5, or may reach the uppermost surface of the surface shaping layer 5.

Figure 4:
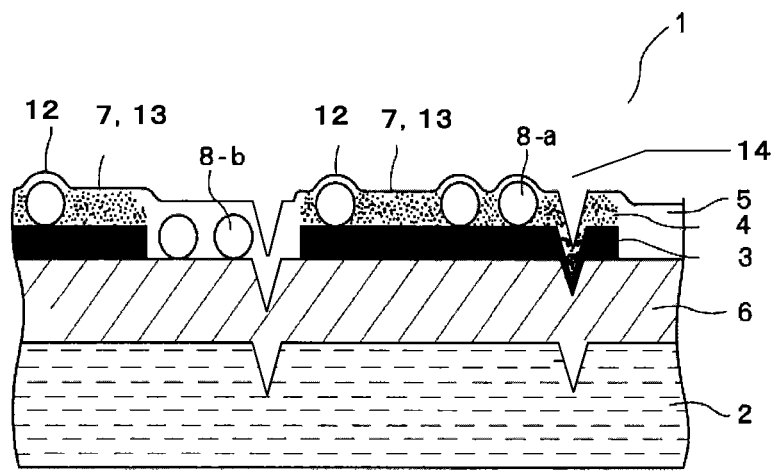
[FIG. 4] is a schematic view showing a section of a shaping sheet of the present invention.

Also, as shown in FIG. 4, a fine raised shape 12 which is revealed by applying a fine particle or baked kaolin particle 8 to the surface shaping layer 5 gives a partially fine raised shape to the raised shape 7 and the fine concave-convex surface 13 which are revealed over the whole of the surface of the surface shaping layer 5.

A shaping sheet having a delicate and daring convex shape and capable of realizing minute shaping with excellent design and touch feeling and having an air of luxuriousness is obtained by effects of the fine concave-convex surface 13 to be brought due to the interacting region 4 in this surface shaping layer 5, effects of the fine raised shape 12 to be brought due to raising of the fine particle on the surface of the surface shaping layer 5, effects of the ink layer 3 and the raised shape 7 formed depending upon its thickness and the concave pattern 14 to be applied by embossing.

Figure 5:
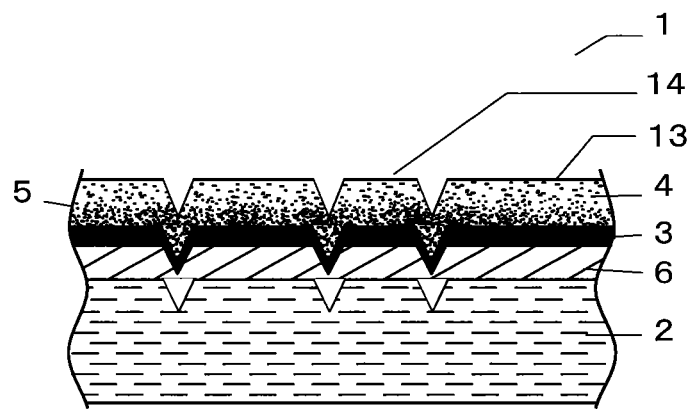
[FIG. 5] is a schematic view showing a section of a shaping sheet of the present invention.
Figure 6:
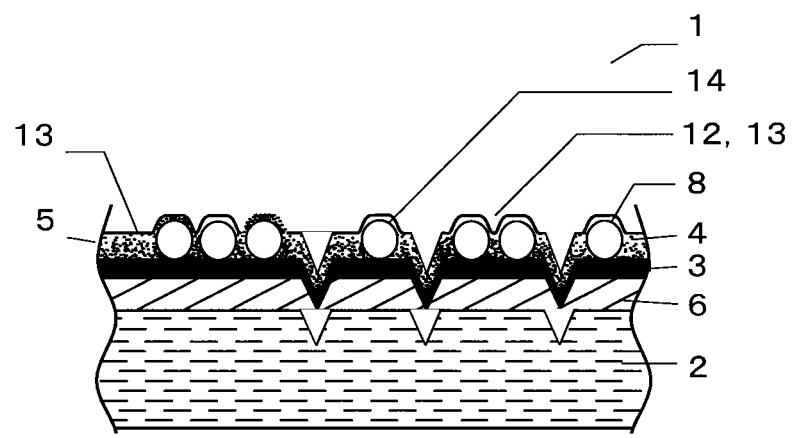
[FIG. 6] is a schematic view showing a section of a shaping sheet of the present invention.
Figure 7:
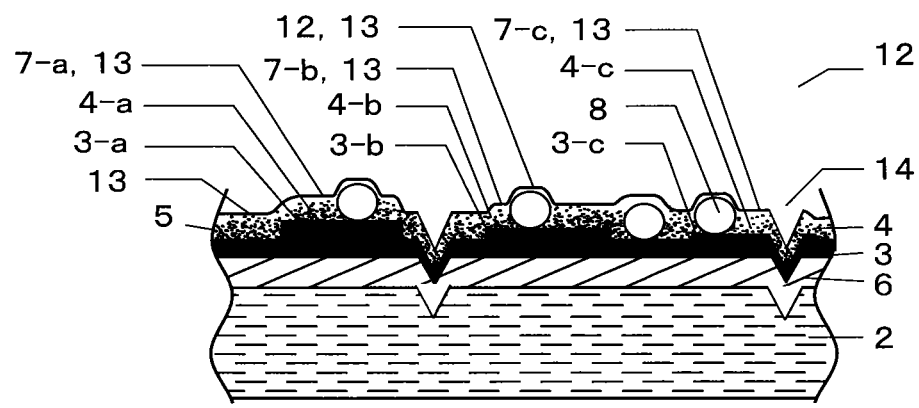
[FIG. 7] is a schematic view showing a section of a shaping sheet of the present invention.

As shown in FIG. 5, when the ink layer 3 is provided over the whole surface, the fine concave-convex surface and the concave pattern 14 due to the fine concave-convex surface 13 are present on the uppermost surface of the surface shaping layer 5, and therefore, when this is used as the shaping sheet, a resin decorative plate which is excellent in a touch feeling nevertheless it is a matte can be obtained on the surface of a decorative plate to be shaped. Even in that case, the facts that by changing a thickness of the ink layer 3 as shown in FIG. 7, the raised shape 7 is obtained depending upon the ink thickness and that by adding the fine particle or baked kaolin particle 8 to the surface shaping layer 5 as shown in FIGS. 6 and 7, the fine raised shape 12 is obtained are the same as those when the foregoing ink layer 3 is partially provided. Also, the degree of a spread of the interacting region 4 which is formed in the surface shaping layer 5 is the same as that described previously and is not particularly limited so far as the effects of the present invention are brought. The interacting region 4 may remain on the way in the thickness direction from the surface of the ink layer 3 to the surface shaping layer 5, or may reach the uppermost surface of the surface shaping layer 5.

Next, the respective layers configuring the shaping sheet of the present invention are described in detail.

[Base Material 2]

The base material 2 which is used in the present invention is not particularly limited so far as it is one used as a base material for usual shaping sheets and can be subjected to embossing, and various papers, plastic films, plastic sheets and the like can be properly chosen depending upon applications. Though these materials may be each used singly, laminates composed of an arbitrary combination, for example, composites of papers each other, composites of paper and a plastic film, etc. may be used.

When such a base material, in particular a plastic film or a plastic sheet is used as the base material, for the purpose of enhancing adhesion to the layer to be provided thereon, a physical or chemical surface treatment, for example, an oxidation process, a roughening process, etc. can be applied to one surface or the both surfaces thereof, if desired. Examples of the foregoing oxidation process include, a corona discharge treatment, a chromium oxidation treatment, a flame treatment, a hot air treatment, an ozone/ultraviolet ray treatment process and the like; and examples of the roughening process include a sand blast process, a solvent treatment process and the like. Though such a surface treatment is properly chosen depending upon the kind of the base material, in general, a corona discharge treatment process is preferably adopted from the standpoints of effects, workability and the like.

Also, the base material may be subjected to a treatment such as formation of a primer layer, etc. for the purpose of strengthening interlayer adhesion between the base material and each layer.

As various papers which are used as the base material, tissue papers, kraft papers, titanium papers and the like can be used. These paper base materials may be one obtained by further adding a resin such as acrylic resins, styrene-butadiene rubbers, melamine resins, urethane resins and the like to such a paper base material (resin impregnation after paper-making or internal addition at the time of paper-making) for the purposes of enhancing an interlayer strength between fibers of the paper base material or between other layer and the paper base material and preventing formation of fuzz. Examples thereof include interlayer reinforced papers, rein-impregnated papers and the like.

In addition to the foregoing, various papers which are frequently used in the building material field, such as linter papers, paper boards, base papers for gypsum boards, raw fabrics for vinyl wall papers in which a vinyl chloride resin layer is provided on the surface of paper, etc. are exemplified. Furthermore, coated papers, art papers, sulfate papers, glassine papers, parchment papers, paraffin papers and Japanese papers, which are used in the business field and usual printing or packaging, etc., can also be used. Also, woven fabrics and non-woven fabrics of various fibers which have an appearance and properties similar to those of papers, though distinguished from these papers, can be used as the base material. Examples of the various fibers include inorganic fibers such as glass fibers, asbestos fibers, potassium titanate fibers, alumina fibers, silica fibers, carbon fibers and the like; and synthetic resin fibers such as polyester fibers, acrylic fibers, vinylon fibers and the like.

Examples of the plastic film or plastic sheet include various films or sheets composed of a synthetic resin of every sort. Examples of the synthetic resin include polyolefin resins, for example, low density polyethylene resins (inclusive of linear low density polyethylene resins), medium density polyethylene resins, high density polyethylene resins, ethylene-α-olefin copolymers, polypropylene resins, polymethylpentene resins, polybutene resins, ethylene-propylene copolymers, propylene-butene copolymers, olefin based thermoplastic elastomers, mixtures thereof, etc.; vinyl based resins, for example, polyvinyl chloride resins, polyvinylidene chloride resins, polyvinyl alcohol resins, vinyl chloride-vinyl acetate copolymer resins, ethylene-vinyl acetate copolymer resins, ethylene-vinyl alcohol copolymer resins, mixtures thereof, etc.; polyester resins, for example, polyethylene terephthalate resins, polybutylene terephthalate resins, polyethylene naphthalate-isophthalate copolymer resins, polyester based thermoplastic elastomers, etc.; acrylic resins, for example, polymethyl (meth)acrylate resins, polyethyl (meth)acrylate resins, polybutyl (meth)acrylate resins, etc.; polyamide resins represented by nylon 6, nylon 66, etc.; cellulose based resins, for example, cellulose triacetate resins, cellophane, etc.; polystyrene resins; polycarbonate resins; polyallylate resins; polyimide resins; and the like.

As the base material 2, plastic films or plastic sheets are preferable, and these materials can be used singly or in admixture of two or more kinds thereof. Of these, taking into account the fact that no poisonous gas is generated at the time of burning and costs, polyolefin resins are especially preferable.

A thickness of the base material 2 is not particularly limited. When a sheet composed of a plastic as a raw material is used, its thickness is in general in the range of from about 40 to 500 μm, preferably from 20 to 150 μm, and more preferably from 30 to 100 μm; and when a paper base material is used, its basis weight is in general in the range of from about 20 to 150 g/m², and preferably from 30 to 100 g/m².

[Penetration Preventing Layer 6]

The penetration preventing layer 6 is a layer which is provided, if desired and has a function of inhibiting an ink constituting the ink layer 3 as described later and a curable resin constituting the surface shaping layer 5 from penetration into the base material 2, and it displays an effect particularly when the base material 2 is a penetrative base material such as papers, non-woven fabrics, etc. Accordingly, the penetration preventing layer 6 may be located between the base material 2 and the ink layer 3. In general, an even and uniform layer obtained through crosslinking and curing of a curable resin having adhesion to the curable resin constituting the surface shaping layer 5 is provided between the base material 2 and the ink layer 3 as shown in FIG. 1. According to this, the penetration preventing layer 6 also has a function to enhance adhesiveness of the base material 2 to the ink layer 3 and the surface shaping layer 5.

[Ink Layer 3]

The ink layer 3 in the shaping sheet of the present invention is a layer which is laminated on the penetration preventing layer 6 to be provided, if desired as shown in FIG. 1 and which produces the raised shape 7 and the fine concave-convex surface 13 on the surface of the surface shaping layer 5.

The mechanism in which the fine concave-convex surface 13 is produced on the surface of the surface shaping layer 5 has not been sufficiently elucidated yet. However, from various experiments and results of observation and measurement, it may be estimated that in coating an uncured material of the curable resin composition for forming the surface shaping layer 5 on the surface of the ink layer 3, the resin component of the ink layer 3 and the surface shaping layer reveal an interaction such as partial elution, dispersion, mixing, etc. by properly choosing a combination of respective materials and a coating condition. On that occasion, it may be considered that the respective resin components in the ink of the ink layer 3 and the uncured material of the curable resin composition do not become in a completely compatible state within a short period of time but become in a suspended state to exist just above the ink layer 3 and in the vicinity thereof, and a portion which has become in the suspended state forms an interacting region and reveals the fine concave-convex surface 13. It may be estimated that when the surface shaping layer is crosslinked and cured while keeping this suspended state, thereby fixing such a state, the interacting region 4 is partially formed in the surface shaping layer, thereby forming the fine concave-convex surface 13.

The ink for forming the ink layer 3 has properties capable of revealing an interaction such as elution, dispersion, mixing, etc. relative to the curable resin composition for forming the surface shaping layer 5 and is properly chosen in relation with the curable resin composition (uncured material). Specifically, the ink is preferably an ink containing a non-crosslinking resin as a binder resin, and for example, a thermoplastic (non-crosslinking) urethane resin, etc. is suitable. Here, from the viewpoints of making an interaction with the curable resin composition for forming the surface shaping layer 5 stronger and obtaining a further pattern concave-convex feeling, it is more preferable that a content of the urethane resin is 50% by mass or more.

As the foregoing urethane resin, it is preferred to choose a non-crosslinking type urethane resin, namely a thermoplastic resin which is not one having a network three-dimensional molecular structure upon being three-dimensionally crosslinked but one having a linear molecular structure. Examples of such a crosslinking type urethane resin include urethane resins obtained by a reaction between, as a polyol component, a polyol such as acrylic polyols, polyester polyols, polyether polyols, etc.; and, as an isocyanate component, an isocyanate, for example, an aromatic isocyanate such as tolylene diisocyanate, xylylene diisocyanate, diphenylmethane diisocyanate, etc., an aliphatic or alicyclic isocyanate such as isophorone diisocyanate, hexamethylene diisocyanate, hydrogenated tolylene diisocyanate, etc., or the like. In general, the number of hydroxyl groups in one molecule of the polyol and the number of isocyanate groups in one molecule of the isocyanate are 2 in average, respectively. Also, an average molecular weight of the urethane resin is from about 10,000 to 50,000, and one having a glass transition temperature (Tg) of from −70 to −40° C. is preferable for the purpose of revealing an interacting region.

Also, if desired, for the purpose of regulating the degree of revealing an interacting region, namely the degree of the fine concave-convex surface 13, a saturated or unsaturated polyester resin, an acrylic resin, a vinyl chloride-vinyl acetate copolymer or the like can be mixed. Of these, a polyester resin is preferable, and an unsaturated polyester resin is especially preferable. The addition amount of the unsaturated polyester resin is preferably in the range of from 10 to 50% by mass relative to the whole amount of the binder of the ink. When the addition amount of the unsaturated polyester resin falls within this range, a sufficient reinforcing effect for revealing an interacting region is obtained. The unsaturated polyester resin is not particularly limited so far as it is a reaction product between an unsaturated dicarboxylic acid and a glycol. Examples of the unsaturated dicarboxylic acid include maleic acid, fumaric acid, itaconic acid and the like; and examples of the glycol include ethylene glycol, diethylene glycol, propylene glycol, butylene glycol and the like.

It is preferred to incorporate an extender pigment into the ink composition for forming the ink layer 3. By incorporating an extender pigment into the ink composition, thixotropy can be imparted thereto, and in printing the ink layer 3 using a plate, the shape of the ink composition is kept. According to this, sharpness of the concave-convex shape in an end at which the convex part transfers into the concave part can be emphasized, and it is possible to express a modulated design.

The extender pigment which is used in the present invention is not particularly limited and is properly chosen among, for example, silica, talc, clay, barium sulfate, barium carbonate, calcium sulfate, calcium carbonate, magnesium carbonate and the like. Of these, silica which is a material having a high degree of freedom of material design in oil absorbency, particle size, pore volume, etc. and having excellent design properties, whiteness and coating stability as an ink is preferable, and finely powdered silica is especially preferable. A particle size of silica is preferably in the range of from 0.1 to 5 μm. When the particle size of silica is 0.1 μm or more, in adding to the ink, the thixotropy of the ink does not become extremely high, and the viscosity of the ink does not excessively increase, and therefore, printing is easily controllable. In other words, the raised shape is easily controlled. Also, in preparing a woodgrain pattern, when it is intended to express a vessel pattern portion, a coating thickness of the ink of the vessel pattern portion is usually not more than 5 μm. When the particle size of silica is smaller than the coating thickness, the raising of the particle is relatively suppressed and is not conspicuous, and therefore, the state of revealing an interacting region becomes natural. Thus, an uncomfortable feeling of the raised shape is hardly produced, and natural finish is attained.

A content of such an extender pigment in the ink composition is preferably in the range of from 5 to 15% by mass. When the content of the extender pigment is 5% by mass or more, sufficient thixotropy can be imparted to the ink composition, whereas when it is not more than 15% by mass, a lowering of the effect for imparting revealment of the raised shape 7 and the fine concave-convex surface 13 is not observed at all, and therefore, such is preferable.

A coating amount of the ink for forming the ink layer 3 is preferably in the range of from 1 to 50 g/m$^2$. When the coating amount of the ink is 1 g/m$^2$ or more, an interaction between the foregoing ink and the resin composition takes place to obtain a sufficient interacting region, and therefore, a sufficient concave-convex shape is obtained on the shaping sheet surface. On the other hand, when it is not more than 50 g/m$^2$, there is no mechanical restriction in printing the ink, and such is economically advantageous. From the foregoing viewpoints, the coating amount of the ink is more preferably in the range of from 1 to 30 g/m$^2$, especially preferably from 1 to 10 g/m$^2$, and mostly preferably from 1 to 7 g/m$^2$.

Also, by changing the coating amount of the ink composition, the thickness of the ink constituting the ink layer 3 can be made non-uniform, and the degree of a difference of elevation of the raised portion to be revealed thereby changes stepwise or continuously. As a result, the pattern of the shaping sheet can be rendered to be a gradation pattern in which the raised shape changes stepwise or a continuous pattern in which an undulation of raising changes continuously.

It may be considered that this is caused due to the fact that as the coating amount of the ink layer 3 relatively increases, the interaction between the ink layer 3 and the surface shaping layer 5 relatively increases, whereby the degree of the suspended state becomes higher, and the undulation of the raised shape becomes larger.

This is hereunder described in detail with reference to FIGS. 3 and 7. In FIGS. 3 and 7, inks 3-*a*, 3-*b* and 3-*c* each constituting the ink layer 3 have a different thickness from each other. That is, the film thickness become relatively thin stepwise in the order of 3-*a*, 3-*b* and 3-*c*. According to this, interacting regions 4-*a*, 4-*b* and 4-*c* can be changed stepwise, and the obtained raised shape rises up stepwise in the order of 7-*c*, 7-*b* and 7-*a*. It may be considered that this is caused due to the fact that the thickness of the ink constituting the ink layer 3 is not uniform, and coating is achieved such that the thickness of the ink decreases in the order of 3-*a*, 3-*b* and 3-*c*, and therefore, in a portion where the thickness of the ink is large, the undulation of the raised shape becomes more remarkable, whereby the thickness of the ink changes such that the undulation of the convex shape becomes small stepwise in the order of 3-*a*, 3-*b* and 3-*c*. By more finely changing the thickness of the ink, the concave-convex shape can be changed continuously, too.

By the shaping sheet having such a structure, it is possible to impart a much more colorful and delicate texture. In general, a method for changing the thickness of the ink constituting the ink layer 3 can be easily carried out by changing the coating amount of the ink, and by changing the coating amount of the ink continuously, the foregoing stepwise change can be changed continuously in a stepless manner.

Figure 8:
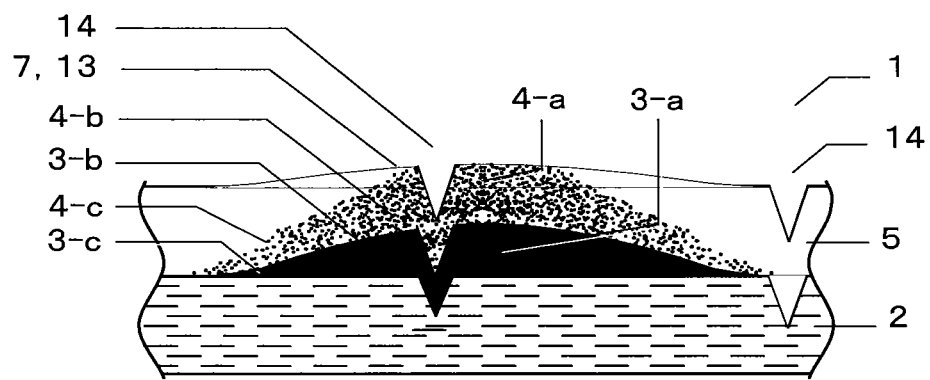
[FIG. 8] is a schematic view showing a section of a shaping sheet of the present invention.
Figure 9:
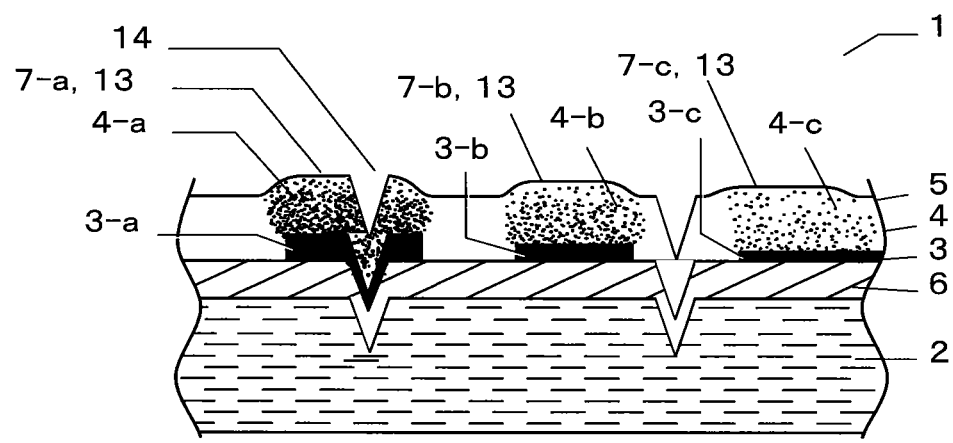
[FIG. 9] is a schematic view showing a section of a shaping sheet of the present invention.

Next, in an example shown in FIG. 8, the ink layer 3 is laminated on the base material 2 such that the thickness changes continuously in a parallel surface to the base material surface (the central part is thick, and the thickness becomes thin toward the side part), and the surface shaping layer 5 obtained through crosslinking and curing of a curable resin composition is laminated thereon. Similar to the example shown in FIG. 3, the surface shaping layer just above the ink layer and in the vicinity thereof forms an interacting region. In the example shown in FIG. 8, in response to the fact that the film thickness of the ink layer becomes thick in the order of 3-*c*, 3-*b* and 3-*a*, the undulation of the raised shape increases continuously in the order of the interacting regions 4-*c*, 4-*b* and 4-*a*. As a result, in the surface shaping layer 5, the undulation of the raised shape increases continuously in this order.

[Surface Shaping Layer 5: Curable Resin Composition]

As described previously, the surface shaping layer 5 is constituted of a material obtained through crosslinking and curing of a curable resin composition. Here, the curable resin composition is composed of a curable resin, components to be added, if desired, various additives and the like. For example, when the curable resin is an ionizing radiation curable resin as described later, the curable resin composition is referred to as an ionizing radiation curable resin composition.

In order to form the surface shaping layer by means of printing, the curable resin composition is required to have printability. Also, in order to form a pattern by means of printing, when a pattern is transferred from a gravure plate into a shaping sheet, it is necessary to set up the curable resin composition such that a transferred pattern does not sag. For these reasons, it is necessary to chiefly use a resin having a high viscosity at the ordinary temperature. Specifically, it is preferred to enhance the thixotropy of the curable resin composition using a polymerizable oligomer or a prepolymer as a principal resin and adding an extender pigment thereto. As the extender pigment, those which are used in the foregoing ink layer 3 can be preferably used. Furthermore, solvent dilution is carried out to decrease the viscosity to a printable range, after forming a pattern by means of printing, the solvent is dried by heating, and crosslinking and curing are then carried out by a method such as heating, irradiation with an ionizing radiation, etc. Also, in order to increase heat resistance and crosslinking density, a polyfunctional polymerizable monomer may be added.

Though the curable resin in the curable resin composition is not particularly limited, examples thereof include thermosetting resins and ionizing radiation curable resins such as melamine based, urea based, epoxy based, ketone based, diallyl phthalate based, unsaturated polyester based and phenol based resins and the like. Of these, ionizing radiation curable resins are preferable from the viewpoint of enhancing the surface strength of the shaping sheet.

The ionizing radiation curable resin as referred to herein refers to a resin having an energy quantum at which a molecule can be crosslinked and polymerizing in electromagnetic waves or charged particle rays, namely a resin capable of being crosslinked and cured upon irradiation with ultraviolet rays, electron beams or the like. Specifically, polymerizable monomers and polymerizable oligomers or prepolymers which have hitherto been customarily used as an ionizing radiation curable resin can be properly chosen and used.

Representatively, the polymerizable monomer is suitably a (meth)acrylate monomer having a radical polymerizable unsaturated group in a molecule thereof. In view of the fact that the (meth)acrylate monomer is included, an interaction with the foregoing ink composition constituting an ink layer is produced, thereby suitably forming a difference in the undulation of the raised shape. From the viewpoints of making the interaction with the ink composition stronger and obtaining a further difference in the undulation of the raised shape and a fine concave-convex surface, a content of the (meth)acrylate monomer is more preferably 50% by mass or more.

A polyfunctional (meth)acrylate is preferable as the (meth)acrylate monomer. The "(meth)acrylate" as referred to herein means "acrylate or methacrylate". The polyfunctional (meth) acrylate is not particularly limited so far as it is a (meth) acrylate having two or more ethylenically unsaturated bonds in a molecule thereof. Specific examples thereof include ethylene glycol di(meth)acrylate, propylene glycol di(meth) acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth) acrylate hydroxypivalate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth) acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth) acrylate, tris(acryloxyethyl) isocyanurate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate and the like. These polyfunctional (meth)acrylates may be used singly or in combinations of two or more kinds thereof.

In the present invention, a monofunctional (meth)acrylate can be properly used together with the foregoing polyfunctional (meth)acrylate for the purpose of reducing a viscosity of the polyfunctional (meth)acrylate so far as the object of the present invention is not impaired. Examples of the monofunctional (meth)acrylate include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth) acrylate, stearyl (meth)acrylate, isobornyl (meth)acrylate and the like. These monofunctional (meth)acrylates may be used singly or in combinations of two or more kinds thereof.

Next, examples of the polymerizable oligomer include oligomers having a radical polymerizable unsaturated group in a molecule thereof, for example, epoxy (meth)acrylate based, urethane (meth)acrylate based, polyester (meth)acrylate based and polyether (meth)acrylate based oligomers, etc. Here, the epoxy (meth)acrylate based oligomer can be obtained by, for example, allowing an oxirane ring of a relatively low molecular weight bisphenol type epoxy resin or novolak type epoxy resin to react with (meth)acrylic acid to achieve esterification. Also, a carboxyl-modified epoxy (meth)acrylate oligomer obtained by partially modifying this epoxy (meth)acrylate based oligomer with a dibasic carboxylic anhydride can be used. The urethane (meth)acrylate based oligomer can be obtained by, for example, esterifying a polyurethane oligomer obtained through a reaction between a polyether polyol or a polyester polyol and a polyisocyanate, with (meth)acrylic acid. The polyester (meth)acrylate based oligomer can be obtained by, for example, esterifying a hydroxyl group of a polyester oligomer having a hydroxyl group on the both ends thereof, which is obtained through condensation between a polyvalent carboxylic acid and a polyhydric alcohol, with (meth)acrylic acid, or esterifying a hydroxyl group on an end of an oligomer obtained by adding an alkylene oxide to a polyvalent carboxylic acid, with (meth) acrylic acid. The polyether (meth)acrylate based oligomer can be obtained by esterifying a hydroxyl group of a polyether polyol with (meth)acrylic acid.

Furthermore, examples of the polymerizable oligomer include, in addition to the foregoing, polybutadiene (meth) acrylate based oligomers having high hydrophobicity and having a (meth)acrylate group on a side chain of a polybutadiene oligomer; silicone (meth)acrylate based oligomers having a polysiloxane bond on a principal chain thereof; aminoplast resin (meth)acrylate based oligomers obtained by modifying an aminoplast resin having a number of reactive groups in a small molecule thereof; and oligomers having a cation polymerizable functional group in a molecule thereof, for example, novolak type epoxy resins, bisphenol type epoxy resins, aliphatic vinyl ethers, aromatic vinyl ethers, etc.

In the present invention, as described previously, an interaction between the ink composition constituting the ink layer 3 and the ionizing radiation curable resin composition constituting the surface shaping layer 5 is important, and suitable ink composition and ionizing radiation curable resin composition are chosen from this viewpoint. It is preferable that the curable resin in the ionizing radiation curable resin composition contains a polyfunctional (meth)acrylate monomer.

When an ultraviolet ray curable resin is used as the ionizing radiation curable resin, it is desirable that a photopolymerization initiator is added in an amount of from about 0.1 to 5 parts by mass based on 100 parts by mass of the curable resin composition. The photopolymerization initiator can be properly chosen among those which have hitherto been customarily used and is not particularly limited. Examples of the photopolymerization initiator for the polymerizable monomer or polymerizable oligomer having a radical polymerizable unsaturated group in a molecule thereof include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio) phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tert-butylanthraqunione, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and the like.

Also, examples of the photopolymerization initiator for the polymerizable oligomer having a cation polymerizable functional group in a molecule thereof include aromatic sulfonium salts, aromatic diazonium salts, aromatic iodonium salts, metallocene compounds, benzoin sulfonic acid esters and the like.

Also, for example, p-dimethyl benzoic acid esters, tertiary amines, thiol based sensitizers and the like can be used as a photosensitizer.

In the present invention, it is preferred to use an electron beam curable resin as the ionizing radiation curable resin. This is because the electron beam curable resin can be used in the absence of a solvent and is more preferable from the environmental or healthy viewpoint, and also, it does not require a photopolymerization initiator and provides a stable curing characteristic.

[Surface Shaping Layer 5: Fine Particle]

Also, it is preferable that the curable resin composition which is used in the present invention is further blended with a fine particle. As this fine particle, one whose average particle size is a neighborhood value on a plus side of a maximum thickness of the surface shaping layer 5 which is located just above the foregoing ink layer 3 is used. The shaping sheet of the present invention having a fine particle blended therein is described in detail with reference to FIG. 4. FIG. 4 is a schematic view showing a section of a shaping sheet having a fine particle blended in a curable resin composition.

In the fine particle 8 (8-a and 8-b) blended in the surface shaping layer, its average particle size $d_A$ is a neighborhood value on a plus side of a maximum thickness $t_M$ of the surface shaping layer 5 which is located just above the ink layer 3, namely $d_A$ is slightly larger than $t_M$, and raising of the fine particle 8-a takes place from the surface of the surface shaping layer 5 which is located just above the ink layer 3. Since a portion where this raising has taken place forms the fine raised shape 12, a fine concave-convex feeling can be formed. At the same time, in the inside of the surface shaping layer 5, the interacting region 4 for revealing a raised shape just above the ink layer 3 and in the vicinity thereof is formed due to an interaction between the ink in the ink layer 3 and the curable resin composition constituting the surface shaping layer 5.

On the other hand, the fine particle 8-b which is located in a portion not just above the ink layer 3 neither rises up nor contributes to revealment of a concave shape. In this way, the effect for revealing a concave shape depending upon the location of a fine particle within the surface shaping layer is diverse.

Accordingly, the concave-convex shape which is revealed on the surface of the surface shaping layer by the effect of the fine raised shape 12 to be brought by raising of the fine particle on the fine concave-convex surface 13 by the interacting region 4 in this surface shaping layer 5 and the surface of the surface shaping layer 5, the effect of the raised shape 7 formed depending upon the foregoing ink layer 3 and its thickness and the concave pattern 14 to be applied by embossing is delicate, daring and excellent in design and touch feeling, has an air of luxuriousness and is minute.

With respect to the maximum thickness $t_M$ of the surface shaping layer 5 which is located just above the ink layer 3, when a convex shape following the formation of the foregoing ink layer 3 is not formed, it means a thickness of the surface shaping layer 5, and when the convex shape is formed, it means a thickness including the subject portion, respectively.

With respect to the foregoing fine particle, what the particle size distribution is closer to a monodispersed system is preferable because not only it is easy to set up its use amount, but the foregoing effects are displayed well in a low use amount.

In the present invention, a coefficient of variation CV value of particle size distribution of the fine particle [{(standard deviation of particle size)/(average particle size)}×100] is preferably not more than 30%. When the foregoing CV value is not more than 30%, the fine particle has practically useful particle size distribution, and the foregoing effects can be sufficiently displayed in an appropriate use amount. This CV value is more preferably not more than 20%, and further preferably not more than 15%.

Furthermore, when an average particle size of the fine particle is defined as $d_A$, a maximum thickness of the surface shaping layer which is located just above the ink layer is defined as $t_M$, and a thickness of the surface shaping layer in a region where the ink layer is not present is defined as $t_G$, it is preferable that a relationship of the expression (I) is satisfied.

$$1.05 \times t_M \leq d_A \leq t_G \tag{I}$$

When the average particle size $d_A$ of the fine particle is $1.05 \times t_M$ or more, even if settling of the fine particle is generated in the ink layer, raising of the fine particle is generated on the surface of the surface shaping layer which is located just above the ink layer, and the foregoing effects are sufficiently displayed. Also, when $d_A$ is not more than $t_G$, raising of the fine particle is suppressed in the surface shaping layer in a region where the ink layer is not present.

The shape of the fine particle is not particularly limited, and spherical, ellipsoidal and polyhedral fine particles and the like can be used, with spherical fine particles being preferable. In the present invention, the particle size of the fine particle having a shape other than a spherical shape is defined to be a value expressed by a diameter of a circumscribing sphere.

A content of the fine particle in the curable resin composition varies depending upon the average particle size of the fine particle, the coefficient of variation CV value of particle size distribution and the like and is usually chosen within the range of from 2 to 20% by mass. When this content is 2% by mass or more, the effects to be brought due to incorporation of the fine particle are displayed, and when it is not more than 20% by mass, a concave-convex feeling of the concave-convex shape formed on the shaping sheet surface is good. The content of the fine particle is preferably from 4 to 16% by mass, and more preferably from 4 to 13% by mass.

The fine particle may be any of an inorganic fine particle or an organic fine particle. As the fine particle, examples of inorganic particles include particles of silica, alumina, aluminosilicate, kaolinite, calcium carbonate, barium sulfate, glass, etc.; and examples of organic fine particles include particles of acrylic resins, polycarbonate resins, urethane based resins, urea based resins, benzoguanamine resins, benzoguanamine-melamine-formaldehyde condensates, etc.

Though these fine particles may be used singly or in combinations of two or more kinds thereof, silica particles are preferable in view of the effects of the present invention. Also, the fine particle may be used in combinations with the foregoing baked kaolin particle having the same effect.

[Surface Shaping Layer 5: Baked Kaolin Particle]

It is preferable that the curable resin composition which is used in the present invention contains a baked kaolin particle. By incorporating the baked kaolin particle in the surface shaping layer, not only the concave-convex shape of the shaping sheet surface becomes delicate due to the formation of the fine raised shape 12, but marring resistance is enhanced. The marring as referred to herein means the fact that when the sheet surface is abraded, a small abrasion is generated, and excellence in the marring resistance as referred to herein means the fact that an abrasion is hardly formed. By imparting such a performance to the shaping sheet, the surface shaping layer is reinforced, whereby a shaping sheet which is able to withstand the use for a longer period of time can be obtained, and the manufacturing costs of a resin decorative plate can be reduced.

The baked kaolin particle which is used for the purpose of imparting finer concave-convex shape and marring resistance to the shaping sheet surface is a kaolin particle obtained by baking a general (hydrated) kaolin particle, and by adding the baked kaolin particle as a filler, an improvement in the marring resistance which could not be realized by a silica particle or a hydrated kaolin particle before baking is realized. A particle size of the baked kaolin particle may be properly chosen depending upon applications, required physical properties, etc., and for example, particles having an average particle size of from about 0.5 to 2 μm are useful. Also, though the addition amount of the baked kaolin particle may be properly chosen depending upon applications, required physical properties, etc., it is, for example, from about 5 to 50 parts by mass based on 100 parts by mass of the curable resin composition.

Also, the baked kaolin particle is more excellent in coating stability than the hydrated kaolin particle.

As the baked kaolin particle, a baked kaolin particle, the surface of which has been further surface treated, may be used. Using this surface treated baked kaolin particle, an effect for enhancing the marring resistance can be further increased. Examples of the surface treatment include a surface treatment with a silane coupling agent. Examples of the silane coupling agent include known silane coupling agents containing an alkoxy group, an amino group, a vinyl group, an epoxy group, a mercapto group, a chlorine group, etc. Examples thereof include γ-aminopropyltriethoxysilane, γ-methacryloxypropyltrimethoxysilane, γ-methacryloxypropylmethyldimethoxysilane, γ-methacryloxypropyldimethylmethoxysilane, γ-methacryloxypropyltriethoxysilane, γ-methacryloxypropyldimethylethoxysilane, γ-acryloxypropyltrimethoxysilane, γ-acryloxypropylmethyldimethoxysilane, γ-acryloxypropyldimethylmethoxysilane, γ-acryloxypropyltriethoxysilane, γ-acryloxypropylmethyldiethoxysilane, γ-acryloxypropyldimethylethoxysilane, vinyltriethoxysilane, γ-glycidoxypropyltrimethoxysilane, γ-mercaptopropyltrimethoxysilane, etc.

[Surface Shaping Layer 5: Reactive Silicone]

It is preferable that the curable resin composition which is used in the present invention further contains a reactive silicone. This is because by incorporating the reactive silicone into the surface shaping layer 5, release properties are enhanced, and resistance to the repetitive continuous use is enhanced. Also, when an additive or a filler such as pearlescent pigments, etc. is incorporated into a body to be shaped, there is brought an effect for suppressing separation of the additive or filler incorporated in the body to be shaped in a manufacturing process of a decorative plate.

The "reactive silicone" as referred to herein means a modified silicone oil in which an organic group is introduced in a side chain or an end thereof and which has reactivity depending upon properties of the organic group to be introduced. Specific examples of the reactive silicone include modified silicone oil side-chain types, modified silicone oil dual-end types, modified silicone oil single-end types, modified silicone oil side-chain dual-end types and the like, in which the organic group to be introduced is an organic group introduced by amino modification, epoxy modification, mercapto modification, carboxyl modification, carbinol modification, phenol modification, methacryl modification, modification with different functional groups or the like.

The foregoing reactive silicone reacts with and bonds to the curable resin at the time of curing of the surface shaping layer, whereby the both are integrated. Accordingly, in molding the decorative plate of the present invention by means of hot press molding, since the reactive silicone does not bleed out onto the surface of the decorative plate, it is possible to remarkably enhance adhesion between the shaping sheet of the present invention and the decorative plate and to shape a decorative material with a delicate design having a fine concave-convex shape.

The use amount of the foregoing reactive silicone is in the range of from about 0.1 to 50 parts by mass, and preferably in the range of from about 0.5 to 10 parts by mass based on 100 parts by mass of the curable resin. When the use amount of the reactive silicone is 0.1 parts by mass or more, peeling of the decorative plate from the surface of the shaping sheet is sufficient so that the concave-convex shape of the surface of the shaping sheet is kept and is able to withstand the use for a longer period of time. On the other hand, when the use amount of the reactive silicone is not more than 50 parts by mass, since repelling is not generated in coating the curable resin composition on the base material, the coating surface does not become rough so that the coating stability is enhanced.

[Surface Shaping Layer 5: Various Additives]

Also, the curable resin composition which is used in the present invention is blended with various additives depending upon desired physical properties of the obtained cured resin layer. Examples of the additive include weatherability improving agents, abrasion resistance enhancing agents, polymerization inhibitors, crosslinking agents, infrared ray absorbers, antistatic agents, adhesiveness enhancing agents, antioxidants, leveling agents, thixotropy imparting agents, coupling agents, plasticizers, defoaming agents, fillers, solvents and the like.

Here, an ultraviolet ray absorber and a light stabilizer can be used as the weatherability improving agent. These materials are added for the purpose of contriving to use the shaping sheet for a long period of time. The ultraviolet ray absorber may be any of an inorganic or organic ultraviolet ray absorber. As the inorganic ultraviolet ray absorber, titanium dioxide, cerium oxide, zinc oxide and the like each having an average particle size of from about 5 to 120 nm can be preferably used. Also, examples of the organic ultraviolet ray absorber include benzotriazole based compounds, specifically 2-(2-hydroxy-5-methylphenyl)benzotriazole, 2-(2-hydroxy-3,5-di-tert-amylphenyl)benzotriazole, 3-[3-(benzotriazole-2-yl)-5-tert-butyl-4-hydroxyphenyl]propionic acid ester of polyethylene glycol and the like. On the other hand, examples of the light stabilizer include hindered amine based compounds, specifically bis(1,2,2,6,6-pentamethyl-4-piperidyl) 2-(3,5-di-tert-butyl-4-hydroxybenzyl)-2'-n-butylmalonate, bis(1,2,2,6,6-pentamethyl-4-piperidyl) sebacate, tetrakis(2,2,6,6-tetramethyl-4-piperidyl)-1,2,3,4-butanetetracarboxylate and the like. Also, a reactive ultraviolet ray absorber or light stabilizer having a polymerizable group such as a (meth)acryloyl group, etc. in a molecule thereof can be used as the ultraviolet ray absorber or light stabilizer.

Examples of the abrasion enhancing agent include inorganic materials, for example, spherical particles of α-alumina, silica, kaolinite, iron oxide, diamond, silicon carbide and the like. Though the particle shape is not particularly limited, examples thereof include a spherical shape, an ellipsoidal shape, a polyhedral shape, a flaky shape and the like, with a spherical shape being preferable. Examples of organic materials include beads of a synthetic resin such as a crosslinked acrylic resin, a polycarbonate resin and the like. A particle size thereof is usually from about 30 to 200% of the film thickness. Of these, spherical α-alumina is especially preferable because it has a high hardness and a large effect for enhancing the abrasion resistance, and a spherical particle is relatively easily obtainable.

Examples of the polymerization inhibitor which is used include hydroquinone, p-benzoquinone, hydroquinone monomethyl ether, pyrogallol, t-butyl catechol and the like; and examples of the crosslinking agent which is used include polyisocyanate compounds, epoxy compounds, metal chelate compounds, aziridine compounds, oxazoline compounds and the like.

Examples of the filler which is used include barium sulfate, talc, clay, calcium carbonate, aluminum hydroxide and the like.

Examples of the infrared ray absorber which is used dithiol based metal complexes, phthalocyanine based compounds, diimmonium compounds and the like.

[Formation of Surface Shaping Layer 5]

In the present invention, a curable resin such as a polymerizable monomer, a polymerization oligomer and the like as the foregoing curable component, components which are added, if desired and various additives are homogenously mixed in prescribed proportions, respectively, thereby preparing a curable resin composition. A viscosity of this curable resin composition is not particularly limited so far as it is a viscosity at which an uncured resin layer can be formed on the surface of a base material by a coating method as described later.

In the present invention, the thus prepared curable resin composition is coated on the surface of a base material in a thickness after curing of from 1 to 20 μm by a known method such as gravure coating, bar coating, roll coating, reverse roll coating, Komma coating and the like, and preferably gravure coating, thereby forming an uncured resin layer. When the thickness after curing is 1 μm or more, a cured resin layer (surface shaping layer) having a desired function is obtained. The thickness of the surface shaping layer after curing is preferably from about 2 to 20 μm.

In the present invention, the thus formed uncured resin layer is heated or irradiated with an ionizing radiation such as heat, electron beams, ultraviolet rays and the like, thereby curing the uncured resin layer and obtaining a surface shaping layer. Here, when electron beams are used as the ionizing radiation, though its accelerating voltage can be properly chosen depending upon the resin to be used or the thickness of the layer, in general, it is preferred to cure the uncured resin layer at an accelerating voltage of from about 70 to 300 kV.

In the irradiation with electron beams, the higher the accelerating voltage, the larger the transmission ability is. Therefore, when a base material which is deteriorated by electron beams is used as the base material, by choosing the accelerating voltage such that a transmission depth of the electron beams is substantially equal to a thickness of the uncured resin layer, the irradiation with excessive electron beams onto the base material can be suppressed, and deterioration of the base material by the excessive electron beams can be kept to a minimum.

An irradiation dosage is preferably an amount at which a crosslinking density of the curable resin in the surface shaping layer is saturated and is in general chosen within the range of from 5 to 300 kGy (0.5 to 30 Mrad), and preferably from 10 to 50 kGy (1 to 5 Mrad).

Furthermore, an electron beam source is not particularly limited, and various electron beam accelerators, for example, a Cockroft-Walton type, a van de Graaff type, a resonance transformer type, an insulating core transformer type, a linear type, a Dynamitron type, a high frequency type and the like can be used.

When ultraviolet rays are used as the ionizing radiation, a radiation including ultraviolet rays having a wavelength of from 190 to 380 nm is irradiated. An ultraviolet ray source is not particularly limited, and for example, a high pressure mercury lamp, a low pressure mercury lamp, a metal halide lamp, a carbon arc lamp and the like are useful.

Various additives can also be added to the thus formed surface shaping layer to impart various functions, for example, a so-called hard coat function having a high hardness and abrasion resistance, a defogging coat function, an antifouling coat function, an antiglare coat function, an antireflection coat function, an ultraviolet ray shielding coat function, an infrared ray shielding coat function and the like.

[Concave Pattern 14]

The concave pattern 14 is provided on the shaping sheet by means of embossing or the like and by giving a deeper concave shape on the surface of the surface shaping layer 5, imparts a design and an air of luxuriousness with an excellent touch feeling by the shaping sheet.

This concave pattern 14 can be formed by heating and pressurization by an embossing plate from an upper surface of the surface shaping layer, namely from the outermost layer side when the shaping sheet of the present invention reaches a temperature at which embossing is possible by any means during the manufacturing process. As shown in FIGS. 1 to 9, as to unevenness which is formed by heating and pressurization by an embossing plate, its deepest portion preferably reaches the upper surface of the base material 2, and an area where the concave pattern 14 is formed is not particularly limited. A depth of the unevenness of the concave pattern 14 varies depending upon the thickness of the shaping sheet and is usually from 20 to 80 μm, and preferably from 30 to 60 μm. In forming the concave pattern 14, a well-known sheet-fed or rotary embossing machine is used. Examples of the shape of the concave pattern 14 include woodgrain vessel channel, stone board surface unevenness, cloth surface texture, satin finished surface, grain, hairline, linear streak and the like. Also, by coordinating the concave pattern 14 with the pattern applied to the foregoing ink layer 3, the effects of the present invention become much more remarkable, but even when the concave pattern 14 is not coordinated with the pattern applied to the foregoing ink layer 3, the effects are sufficiently obtainable.

[Resin Decorative Plate: Resin Decorative Plate-1]

The resin decorative plate of the present invention is not particularly limited so far as it is prepared by using the shaping sheet of the present invention. As a preferred embodiment thereof, there is exemplified a resin decorative plate shown in FIG. 10, which is obtained by laminating an adhesive layer and a decorative sheet layer in this order on an upper surface of a substrate, coating a resin composition on the decorative sheet layer, subsequently bringing the shaping sheet of the present invention into contact therewith and integrally curing and then peeling the shaping sheet to form a resin layer.

[Resin Decorative Plate-1: Substrate 10]

Though a substrate 10 of the resin decorative plate of the present invention is not particularly limited, plastic films, plastic sheet metal plates, wood based plates such as woods, etc., ceramic based raw materials and the like can be properly chosen depending upon applications. When such a substrate, in particular a plastic sheet is used as the substrate, for the purpose of enhancing adhesion to the decorative material, a physical or chemical surface treatment, for example, an oxidation process, a roughening process, etc. can be applied to one surface or the both surfaces thereof, if desired. The foregoing oxidation process and roughening process are the same as those described previously in the base material of the shaping sheet of the present invention.

The plastic film and plastic sheet are the same as those described previously in the base material of the shaping sheet of the present invention.

As the metal plate, those made of, for example, aluminum, iron, stainless steel, copper or the like can be used, and those obtained by plating with such a metal can also be used.

Examples of the wood based plate include woody materials such as sliced veneers, veneers, plywood, particle boards and medium density fiber (MDF) boards of various raw materials, for example, Japanese cedar, Japanese cypress, Japanese zelkova, pine, lauan, teak, Melapi, etc., and the like. These materials can be used alone or in the form of a laminate. The wood based plate includes not only woody plates but paper powder-containing plastic plates and papers having a reinforced strength.

Examples of the ceramic based raw material include ceramic based building materials such as gypsum boards, calcium silicate boards, wood chip cement boards and the like; pottery and porcelain, glass, enamels, baked tiles, boards composed of volcanic ash as a main raw material and the like.

In addition to the foregoing materials, composites of various raw materials such as plates of a fiber-reinforced plastic (FRP), plates obtained by sticking an iron plate on the both surfaces of a paper honeycomb, plates obtained by interposing a polyethylene resin by two aluminum plates and the like.

[Resin Decorative Plate-1: Adhesive Layer 9]

An adhesive layer 9 is a layer which is provided for the purpose of bonding the substrate 10 and a decorative sheet layer 17 to each other.

An adhesive which is used for the adhesive layer 9 is coated using a coating device such as a spray, a spreader, a bar coater and the like. Urea based, vinyl acetate resin based, urea resin based, melamine resin based, phenol resin based and isocyanate based adhesives and the like can be used as this adhesive. Such an adhesive is used singly or as a mixed adhesive as an arbitrary mixture. If desired, the adhesive can be added to and mixed with an inorganic powder such as talc, calcium carbonate, clay, titanium white and the like, wheat flour, wood flour, plastic flour, a colorant, an insecticide, an antiseptic or the like. In general, the adhesive has a solids content of from 35 to 80% by mass and is coated in a coating amount in the range of from 50 to 300 g/m² on the surface of the substrate.

In general, sticking of the decorative sheet layer 17 onto the substrate 10 is carried out by a method in which the adhesive layer 9 is formed on a back surface of the decorative sheet layer 17, and the substrate 10 is then stuck thereonto; a method in which an adhesive is coated on the substrate 10, and the decorative sheet layer 17 is then stuck thereonto; or the like. Sticking can be carried out by a sticking device such as a cold press, a hot press, a roll press, a laminator, a wrapping machine, an edge-sticking machine, a vacuum press and the like.

[Resin Decorative Plate-1: Decorative Sheet Layer 17]

The decorative sheet layer 17 gives decorative properties to the resin decorative plate of the present invention and is a layer in which a solid printing layer 17-*b* and a design layer 17-*c* which are provided, if desired are provided in this order on the sheet layer 17-*a*.

The sheet layer 17-*a* is not particularly limited so far as it is a material which is used as a base material of usual decorative sheets, and various papers, plastic films and plastic sheets and the like can be properly chosen depending upon applications. Though these materials may be respectively used singly, a laminate composed of an arbitrary combination such as composites of papers each other, composites of paper and a plastic film and the like may be used.

When such a base material, in particular a plastic film or a plastic sheet is used as the base material, for the purpose of enhancing adhesion to the layer which is provided thereon, a physical or chemical surface treatment, for example, an oxidation process, a roughening process, etc. can be applied to one surface or the both surfaces thereof, if desired. The foregoing oxidation process and roughening process are the same as those described previously in the base material of the shaping sheet of the present invention. Also, the substrate may be subjected to a treatment such as formation of a primer layer and the like, or may be previously coated for the purpose of regulating a tint or formed with a pattern from the design viewpoint.

The various papers, plastic films and plastic sheets which are used as the sheet layer 17-*a* are the same as those described previously in the base material of the shaping sheet of the present invention.

A thickness of the sheet layer 17-*a* is not particularly limited. When a sheet made of a plastic as a raw material is used, its thickness is in general in the range of from about 20 to 150 µm, and preferably from 30 to 100 µm; and when a paper base material is used, its basis weight is in general in the range of from about 20 to 150 g/m², and preferably from 30 to 100 g/m².

The solid printing layer 17-*b* which is provided on the sheet layer 17-*a* is a layer which is provided, if desired for the purpose of enhancing design properties of the resin decorative plate of the present invention and which is also called a hiding layer. When the sheet layer 17-*a* itself is colored, or color irregularity is present, the solid printing layer 17-*b* is formed by regulating the color of the surface of the sheet layer 17-*a*, thereby giving an intended tint to the surface on the sheet layer 17-*a*. In general, though the solid printing layer 17-*b* is frequently formed of an opaque color, there may be the case where the solid printing layer 17-*b* is formed of a colored transparent color, thereby making the best of a pattern which the backing has. When it is intended to make the best of a white color of the sheet layer 17-*a*, or when the sheet layer 17-*a* itself is adequately colored, it is not necessary to form the solid printing layer 17-*b*.

As the ink which is used for forming the solid printing layer 17-*b*, an ink obtained by properly mixing a binder with a colorant such as pigments, dyes and the like, an extender pigment, a solvent, a stabilizer, a plasticizer, a catalyst, a curing agent, etc. is useful. The binder is not particularly limited, and materials selected among, for example, polyurethane based resins, vinyl chloride/vinyl acetate based copolymer resins, vinyl chloride/vinyl acetate/acrylic copolymer resins, chlorinated polypropylene based resins, acrylic resins, polyester based resins, polyamide based resins, butyral based resins, polystyrene based resins, nitro cellulose based resins, cellulose acetate based resins and the like are used singly or in admixture of two or more kinds thereof.

Examples of the colorant which is used include inorganic pigments such as carbon black (sumi), iron black, titanium white, antimony white, chrome yellow, titanium yellow, red iron oxide, cadmium red, ultramarine blue, cobalt blue and the like; organic pigments or dyes such as quinacridone red, isoindolinone yellow, phthalocyanine blue and the like; metal pigments composed of a flaky foil piece of aluminum, bronze, etc.; pearlescent (pearl) pigments composed of a flaky foil piece of titanium dioxide-coated mica, basic lead carbonate, etc.; and the like.

The design layer 17-*c* gives decoration properties to the sheet layer 17-*a* and is formed by printing various patterns on the sheet layer 17-*a* or the solid printing layer 17-*b* using a printer. Examples of the pattern include woodgrain patterns, stone-grain patterns imitating the surface of a rock such as a marble pattern (for example, a travertine marble pattern), etc., fabric patterns imitating a texture or cloth-like pattern, tiling patterns, brick work patterns and the like and also include composite patterns thereof such as a parquetry pattern, a patchwork pattern and the like. Such a pattern is formed by multicolor printing with process colors including yellow, red, blue and black of usual colors and in addition thereto, is formed by multicolor printing with special colors by preparing plates of individual colors.

The same inks as those used in the solid printing layer 17-*b* can be used as the design inks to be used in the design layer 17-*c*.

[Resin Decorative Plate-1: Resin Layer 18]

A resin layer 18 is a layer formed by coating a resin composition on the decorative sheet layer 17, subsequently bringing a shaping sheet into contact therewith and integrally curing and then peeling the shaping sheet. A thickness of the resin layer 18 is preferably from 100 to 500 g/m$^2$, more preferably from 100 to 350 g/m$^2$, and further preferably from 150 to 250 g/m$^2$.

The resin composition is a composition composed of a polymerization initiator, a polymerization accelerator, a polymerization inhibitor and other additives, each of which is added, if desired as well as a resin.

The resin in the resin composition which is used in the present invention is not particularly limited so far as it is cured at the ordinary temperature or by heating. Examples thereof include silicone resins, unsaturated polyester resins, saturated polyester resins, melamine resins, diallyl phthalate (DAP) resins, polycarbonate resins, phenol resins, polyamides, ketone resins, epoxy resins, urethane resins, urea resins, acrylic resins, vinyl resins, alkyd resins, amino alkyd resins, hydrocarbon resins (aromatic and aliphatic hydrocarbon resins), rubber based resins, fluorocarbon resins and the like. Of these, unsaturated polyester resins are preferable.

The polymerization initiator, the polymerization accelerator and the polymerization inhibitor are added for the purpose of regulating a curing rate of the resin composition.

The polymerization initiator is properly chosen and used among, for example, peroxides such as methyl ethyl ketone peroxide, benzoyl peroxide, hydroperoxide and the like; and radical initiators such as azobisisobutyronitrile. The addition amount of the polymerization initiator in the resin composition is preferably from 0.5 to 3% by mass, and more preferably from 0.5 to 2.0% by mass.

As the polymerization accelerator, for example, a metal compound such as a cobalt compound, e.g., cobalt naphthenate, etc., a vanadium compound, a manganese compound, etc., an amine based compound such as dimethyl nitrile, etc. or the like is used preferably in a proportion of from 0.1 to 2.0% by mass, and more preferably from 0.3 to 1.0% by mass in the resin composition. As the polymerization inhibitor, for example, hydroquinone, trihydroquinone, benzoquinone, trihydrobenzene and the like can be used. As other additives, for example, for the purposes of regulating the coating viscosity and crosslinking the resin, there can be preferably exemplified vinyl group-containing compounds such as a styrene monomer and the like. The addition amount thereof is preferably from 10 to 40% by mass, and more preferably from 15 to 30% by mass in the resin composition.

These curing rate regulators and other additives can be used singly or in combinations.

[Resin Decorative Plate: Resin Decorative Plate-2]

Figure 12:
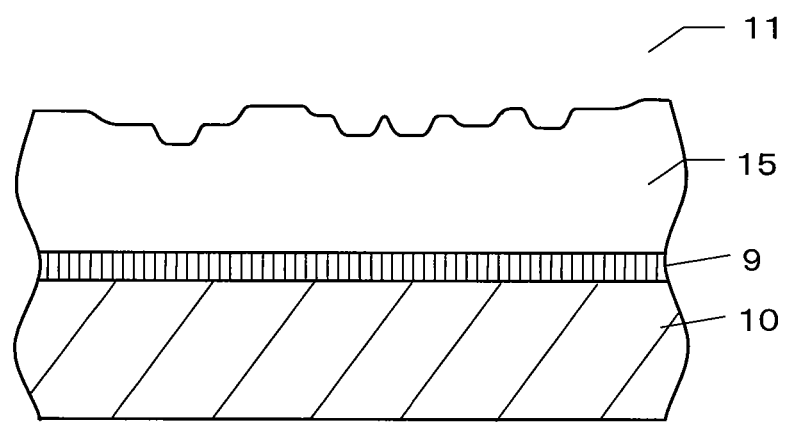
[FIG. 12] is a schematic view showing a section of a resin decorative plate of the present invention.

As a preferred embodiment of the resin decorative plate of the present invention, there is exemplified a resin decorative plate shown in FIG. 12, in which a resin decorative sheet obtained by inserting a shaping sheet of the present invention between a molded article to be press molded between hot press plates and a press plate and molding and then peeling the shaping sheet is stuck to a substrate via an adhesive layer.

Examples of a resin decorative sheet 15 include melamine resin decorative sheets, diallyl phthalate (DAP) resin decorative sheets, polycarbonate resin decorative sheets and polyester decorative sheets because they have a hard surface, are excellent in heat resistance and antifouling properties, and are able to choose abundant multicolored patterns from the design standpoint. Of these, melamine resin decorative sheets and diallyl phthalate (DAP) resin decorative sheets are especially preferable. Also, the substrate 10 serving as an adherend and an adhesive which is used for the adhesive layer 9 are the same as those described previously.

[Resin Decorative Plate: Manufacturing Method of Resin Decorative Plate-1]

Figure 10:
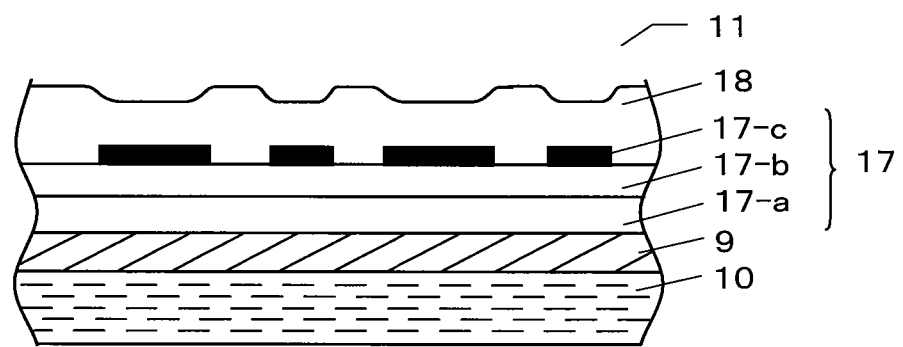
[FIG. 10] is a schematic view showing a section of a resin decorative plate of the present invention.
Figure 11:
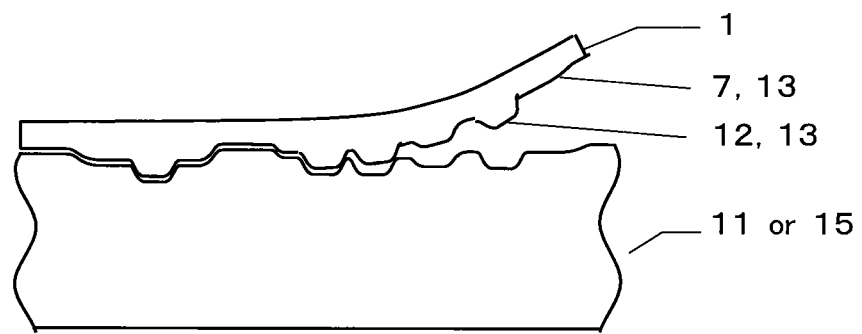
[FIG. 11] is a schematic view showing a peeling process of a shaping sheet of the present invention.

The resin decorative plate of the present invention is preferably a resin decorative plate shown in FIG. 10, which is obtained by laminating the adhesive layer 9 and the decorative sheet layer 17 in this order on an upper surface of the substrate 10, coating a resin composition on the decorative sheet layer, subsequently bringing the shaping sheet of the present invention into contact therewith and integrally curing and then peeling the shaping sheet to form the resin layer 18. Peeling of the shaping sheet 1 is carried out in the manner shown in FIG. 11, thereby obtaining a resin decorative plate 11 having a certain shape shaped thereon.

[Resin Decorative Plate: Manufacturing Method of Resin Decorative Plate-2]

Also, the resin decorative plate of the present invention is preferably a resin decorative plate shown in FIG. 12, which is obtained by sticking the resin decorative sheet 15 having a certain shape shaped thereon, which is obtained by inserting a shaping sheet between a molded article to be press molded between hot press plates and a press plate and molding and after hot press molding, peeling the shaping sheet from a body to be shaped, to the substrate 10 via the adhesive layer 9. Peeling of the shaping sheet 1 is carried out in the manner shown in FIG. 11, thereby obtaining the resin decorative plate 11 having a certain shape shaped thereon.

On that occasion, a press plate onto the surface of which embossing has been applied can be suitably used as the foregoing press plate. Using such a press plate, an air of texture with a further increased touch feeling can be imparted to the resin decorative plate of the present invention. A depth of the unevenness of embossing by this press plate is usually from 20 to 80 μm, and preferably from 30 to 60 μm, and examples of the shape include woodgrain vessel channel, board surface unevenness, cloth surface texture, satin finished surface, grain, hairline, linear streak and the like. Also, by coordinating the pattern with the pattern applied to the foregoing ink layer 3, the effects of the present invention become much more remarkable, but even when the pattern is not coordinated with the pattern applied to the foregoing ink layer 3, the effects are sufficiently obtainable.

A method for manufacturing the foregoing resin decorative sheet 15 is not particularly limited so far as it is a generally employed method. Above all, the preferred melamine resin decorative sheet and diallyl phthalate (DAP) resin decorative sheet are generally obtained according to the following manufacturing method.

The melamine resin decorative sheet is obtained by laminating a melamine resin-impregnated sheet on about four sheets of phenol resin-impregnated core papers and further laminating a melamine resin-impregnated overlay paper thereon, interposing the laminate between two mirror finished metal plates, inserting the foregoing shaping sheet into the surface, hot pressing the resultant, for example, at 0.98 MPa and 160° C. for 20 minutes and after allowing to stand for cooling to room temperature, peeling the foregoing shaping sheet.

Also, the diallyl phthalate (DAP) resin decorative sheet is obtained by superimposing a diallyl phthalate resin-impregnated paper successively on a plate-shaped base material, hot pressing the resultant at 140 to 150° C. and 0.98 MPa for about 10 minutes using the foregoing shaping sheep between mirror finished metal plates in the same manner as in the manufacturing method of a melamine resin decorative sheet and after allowing to stand for cooling to room temperature, peeling the foregoing shaping sheet. In any case, a delicate and daring decorative plate having a concave-convex shape is produced.

The thus obtained resin decorative sheet 15 can be used as a resin decorative plate upon being stuck to various substrates. Specifically, as shown in FIG. 12, the resin decorative plate 11 is obtainable by sticking the decorative plate 11 to the substrate 10 via the adhesive layer 9. The substrate 10 serving as an adherend and an adhesive and an adhesion method to be used for the adhesive layer 9 are the same as those described previously.

[Resin Decorative Plate]

The resin decorative plate which is manufactured by the method of the present invention is delicate and daring, is excellent in design and touch feeling and has an air of luxuriousness due to the effect of a raised shape formed depending upon the ink layer in the shaping sheet of the present invention and its thickness, the effect to be brought by the fine concave-convex surface, the effect to be brought due to raising of a fine particle (fine raised shape), the effect to be brought by a concave pattern applied by embossing, the effect to be brought by embossing against a hot press plate which is used for preparing a resin decorative plate and the like. From the viewpoint of bringing these effects, a surface roughness of the resin decorative plate in an area applied by embossing is preferably from 20 to 80 µm, and more preferably from 30 to 60 µm. Also, a surface roughness of the resin decorative plate in an area corresponding to the raised shape and fine concave-convex surface is preferably from 0.1 to 10 µm, and more preferably from 1 to 8 µm.

The resin decorative plate of the present invention can be cut into an arbitrary size, and the surface or butt end part thereof can be subjected to arbitrary decorating works such as grooving work, chambering work and the like using a cutting work machine such as a router, a cutter and the like. The resin decorative plate of the present invention can be used for various applications, for example, interior or exterior materials for buildings such as walls, ceilings, floors and the like, surface decorative plates for fittings such as window frames, doors, balustrades, base boards, verandahs, malls and the like, surface decorative plates of cabinets for kitchen wares, furniture, light electrical appliances, OA appliances and the like, interior and exterior decorations for vehicles and the like.

EXAMPLES

The present invention is hereunder described in more detail with reference to Examples and Comparative Example, but it should not be construed that the present invention is limited thereto.

(Evaluation Methods)

Shaping sheets and decorative plates obtained in the respective Examples were evaluated by the following methods.

(1) Measurement of Surface Roughness:

A decorative plate having a size of 400 mm long by 400 mm wide was measured for a surface roughness (arithmetic average surface roughness) using a three-dimensional non-contact surface profilometer system (MICROMAP, manufactured by Ryoka System Inc.).

(2) Peeling Properties:

A peeling strength of a shaping sheet was measured using a tensile/compression tester (RTC-1250A, manufactured by Orientec Co., Ltd.). An objective sample for evaluation had a size of 25 mm wide by 50 mm long, and the test was carried out at a peeling speed of 300 mm/min and a peeling direction of 180° (vertical direction) in a load cell load of 10 N at a measurement environmental temperature of 23° C. (room temperature).

(3) Continuous Moldability:

Molding was carried out 10 times using the same shaping sheet, a peeling strength was measured at every molding, and peeling stability was measured during repeated use of the shaping sheet.

Example 1

Preparation of Shaping Sheet

A primer ink (acrylic resin "EBF Coordinated Primer", manufactured by Showa Ink manufacturing Co., Ltd.) was subjected to gravure printing over the entirety of an easy adhesion-treated surface of a polyester film ("A4100 (50 µm)", manufactured by Toyobo Co., Ltd.) which had been previously subjected to an easy adhesion treatment, thereby forming a penetration preventing layer 6 (primer layer).

Subsequently, using a pattern printing plate, an ink (a urethane based vessel ink "VESSEL MINI (A)", manufactured by The Intec Inc.) was printed on a vessel portion of a woodgrain pattern, thereby forming an ink layer 3. Furthermore, an electron beam curable resin composition prepared by adding 5% by mass of a baked kaolin particle and 2% by mass of a reactive silicone methacrylate to an electron beam curable resin ("REB-GE", manufactured by Dainichiseika Color & Chemicals Mfg. Co., Ltd.) was coated in a coating amount of 4 g/m$^2$ on these ink layers by a gravure offset coater method. After coating, electron beams were irradiated at an accelerating voltage of 175 kV and an irradiation dose of 30 kGy (3 Mrad) to cure the electron beam curable resin composition, thereby forming a surface shaping layer 5. Furthermore, a concave pattern which is coordinated with the thus formed ink layer 3 was applied by means of embossing from the side of the surface shaping layer 5 through offline. The shaping sheet was a film having an air of luxuriousness and an expression of a delicate woodgrain.

Example 2

Preparation of Resin Decorative Plate

A melamine resin-impregnated sheet was laminated on about four sheets of phenol resin-impregnated core papers, and a melamine resin-impregnated overlay paper of about 35 g/m$^2$ was further laminated thereon; the laminate was interposed between two mirror finished metal plates (in which the metal plate coming into contact with the surface side of the resin decorative plate had been subjected to embossing); the shaping sheet prepared in Example 1 and having a concave-convex shape formed on the surface thereof was inserted; and the resultant was hot pressed at 0.98 MPa and 160° C. for 20 minutes. After allowing to stand for cooling to room temperature, the shaping sheet was peeled, thereby obtaining a melamine resin decorative sheet having a delicate and daring concave-convex shape, excellent design and touch feeling and an air of luxuriousness, in which a surface roughness of the fine concave-convex surface of the shaping sheet and an area shaped by the concave-convex shape by a raised shape was from 2 to 4 µm, and a surface roughness of an area having been subjected to embossing was from 10 to 12 µm. Also, in the obtained melamine resin decorative sheet, a concave-convex feeling of the vessel portion was realistically expressed, and the same texture as in a material using an actual wood was displayed.

Also, the shaping sheet obtained in Example 1 was rich in durability, and even when molding was repeated 10 times, the surface shape and the peeling properties (easiness for peeling) after shaping did not change at all.

Example 3

An interlayer-reinforced paper for building material having a basis weight of 30 g/m² was used as a base material, one surface of which was then provided with a solid printing layer having a coating amount of 5 g/m² by means of gravure printing using an ink containing an acrylic resin and nitrocellulose as a binder and titanium white, red iron oxide and chrome yellow as a colorant. A design layer having a woodgrain pattern was formed thereon by means of gravure printing using an ink containing nitrocellulose as a binder and a colorant composed of red iron oxide as a principal component, thereby obtaining a decorative sheet layer. Subsequently, after roll coating a urea-vinyl acetate based adhesive on MDF of the substrate, the obtained decorative sheet layer was stuck.

Thereafter, a polyester resin composition obtained by mixing an unsaturated polyester and a peroxide was coated in a coating amount of 200 g/m² over the entirety of an upper surface of the decorative sheet layer; the shaping sheet obtained in Example 1 was covered thereon and brought into contact therewith while being registered at a register mark; the resultant was rolled and deaerated five times at 0.98 MPa/930 m/m using a rubber roll such that the registered position was not deviated; heating was carried out at 40° C. for 2 hours; and the polyester resin was cured at room temperature. After curing, the resultant was aged for one hour and allowed to stand for cooling to room temperature; and the shaping sheet was peeled to obtain a polyester decorative sheet in which the same concave-convex feeling of the vessel portion as in Example 2 was realistically expressed and which had the same texture as in a material using an actual wood.

Also, the shaping sheet obtained in Example 1 was rich in durability, and even when molding was repeated 10 times, the surface shape and the peeling properties (easiness for peeling) after shaping did not change at all.

Comparative Example 1

A convex pattern layer made of a urethane acrylate based ultraviolet ray curable resin (XD-808, manufactured by manufactured by Dainichiseika Color & Chemicals Mfg. Co., Ltd.) was formed on an easy adhesion-treated surface of a PET film ("A4100 (100 μm)", manufactured by Toyobo Co., Ltd.) which had been previously subjected to an easy adhesion treatment by means of a drum printing film (hereinafter referred to as "DPS") mode.

A concave-convex pattern with a woodgrain design (depth: 70 μm, each of width of convex part and width of concave part: 35 μm) was provided on a roll concave plate surface by an etching method. A line speed of the DPS mode was regulated at 10 m/min, and two 160-W ozone high-pressure mercury lamps (manufactured by Japan Storage Battery Co., Ltd.) were used for irradiation with ultraviolet rays.

The thus obtained shaping sheet had a concave-convex shape. Using the thus obtained shaping sheet, the same operation as in Example 2 was followed, thereby preparing a melamine resin decorative plate.

Though the decorative plate according to Comparative Example 1 had a good expression of a dynamic concave-convex feeling, it could not express a delicate concave-convex shape. Also, the film was required to use a thick sheet with nerve in view of an issue of manufacture, and the manufacturing costs were high. The durability and peel properties were equal to those in Example 2.

INDUSTRIAL APPLICABILITY

Since the shaping sheet of the present invention has a delicate and daring concave-convex shape, is capable of realizing minute shaping with excellent design and touch feeling and having an air of luxuriousness and is excellent in release properties, a resin decorative plate can be obtained by using this shaping sheet. In particular, when used for a delicate pattern such as a woodgrain pattern, a concave-convex feeling of a vessel portion can be realistically expressed, and a shaped decorative material is able to obtain the same texture as in a material using an actual wood.

We claim:

1. A method for manufacturing a resin decorative plate, the method comprising:
    laminating an adhesive layer and a decorative sheet layer in this order on an upper surface of a substrate;
    coating a resin composition on the decorative sheet layer;
    contacting a shaping sheet with the resin composition, integrally curing the resin composition and then peeling the shaping sheet to form a shaped resin layer on the decorative sheet layer,
    wherein the shaping sheet comprises:
    a base material;
    an ink layer covering at least a part of a surface of the base material; and
    a surface shaping layer in direct contact with the ink layer such that the surface shaping layer covers a whole surface of the base material, including both a region where the ink layer is formed and, if present, a region where the ink layer is not formed,
    wherein the surface shaping layer is obtained through crosslinking and curing of a curable resin composition, and a surface of the surface shaping layer directly above the region where the ink layer is formed has a convex shape and a concave pattern, and
    wherein the concave pattern is made by embossing, a depth of unevenness of the concave pattern is from 20 to 80 μm, and a deepest portion of the unevenness of the concave pattern reaches to an upper surface of the base material.

2. A method for manufacturing a resin decorative plate, the method comprising:
    inserting a shaping sheet between an article to be press molded and a press plate;
    hot press molding the article to be press molded using the shaping sheet;
    peeling the shaping sheet from the article to obtain a resin decorative sheet; and
    adhering the resin decorative sheet to a substrate with an adhesive layer to obtain a resin decorative plate,
    wherein the shaping sheet comprises:
    a base material;
    an ink layer covering at least a part of a surface of the base material; and
    a surface shaping layer in direct contact with the ink layer such that the surface shaping layer covers a whole surface of the base material, including both a region where the ink layer is formed and, if present, a region where the ink layer is not formed,
    wherein the surface shaping layer is obtained through crosslinking and curing of a curable resin composition, and a surface of the surface shaping layer directly above the region where the ink layer is formed has a convex shape and a concave pattern, and wherein the concave pattern is made by embossing a depth of unevenness of the concave pattern is from 20 to 80μm, and a deepest portion of the unevenness of the concave pattern reaches to an upper surface of the base material.

3. The method of claim 1, wherein the surface shaping layer comprises fine particles.

4. The method of claim 3, wherein the fine particles have an average size greater than T, where T is a thickness of the surface shaping layer in a region not comprising the fine particles.

5. The method of claim 1, wherein the curable resin composition is an ionizing radiation curable resin composition.

6. The method of claim 5, wherein the ionizing radiation curable resin composition is an electron beam curable resin composition.

7. The method of claim 1, wherein the ink layer comprises an ink comprising a non-cross linking urethane resin.

8. The method of claim 5, wherein the ink layer comprises an ink comprising a non-crosslinking urethane resin, and the ionizing radiation curable resin composition comprises a (meth)acrylate monomer.

9. The method of claim 1, wherein the ink layer comprises an ink comprising (i) a non-crosslinking urethane resin and (ii) an unsaturated polyester resin.

10. The method of claim 5, wherein the ink layer comprises an ink comprising (i) a non-crosslinking urethane resin and (ii) an unsaturated polyester resin, and the ionizing radiation curable resin composition comprises a (meth)acrylate monomer.

11. The method of claim 1, wherein the base material is a plastic film or a plastic sheet.

12. The method of claim 1, wherein the base material is a polyolefin resin.

13. The method of claim 1, wherein a thickness of the base material is 30 to 100 μm.

14. The method of claim 7, wherein the ink comprises 50 mass % or more of the non-crosslinking urethane resin, based on a mass of the ink.

15. The method of claim 7, wherein the non-crosslinking urethane resin has an average molecular weight of 10,000 to 50,000.

16. The method of claim 7, wherein the non-crosslinking urethane resin has a glass transition temperature of −70 to −40° C.

17. The method of claim 1, wherein the ink layer comprises an ink comprising an extender pigment.

18. The method of claim 17, wherein the ink comprises 5 to 15 mass % of the extender pigment.

19. The method of claim 17, wherein the extender pigment comprises finely powdered silica.

20. The method of claim 19, wherein a particle size of the finely powdered silica is 0.1 to 5 μm.

21. A method for manufacturing a resin decorative plate, the method comprising:

providing a substrate, an adhesive layer and a decorative sheet layer in this order, wherein the decorative sheet layer or a shaped resin layer provided thereon is made by a shaping sheet, wherein the shaping sheet comprises:

a base material;

an ink layer covering at least a part of a surface of the base material; and a surface shaping layer in direct contact with the ink layer such that the surface shaping layer covers a whole surface of the base material, including both a region where the ink layer is formed and, if present, a region where the ink layer is not formed, wherein the surface shaping layer is obtained through crosslinking and curing of a curable resin composition, and a surface of the surface shaping layer directly above the region where the ink layer is formed has a convex shape and a concave pattern, and wherein the concave pattern is made by embossing depth of unevenness of the concave pattern is from 20 to 80 μm, and deepest portion of the unevenness of the concave pattern reaches to an upper surface of the base material.

\* \* \* \* \*